(12) United States Patent
Reynen

(10) Patent No.: US 12,403,735 B2
(45) Date of Patent: Sep. 2, 2025

(54) VEHICULAR UTILITY MOUNT SYSTEM

(71) Applicant: Mark Reynen, Austin, MN (US)

(72) Inventor: Mark Reynen, Austin, MN (US)

(*) Notice: Subject to any disclaimer, the term of this patent is extended or adjusted under 35 U.S.C. 154(b) by 7 days.

(21) Appl. No.: 18/197,995

(22) Filed: May 16, 2023

(65) Prior Publication Data

US 2024/0383288 A1    Nov. 21, 2024

(51) Int. Cl.
*B60D 1/52*    (2006.01)
*B60D 1/48*    (2006.01)

(52) U.S. Cl.
CPC .............. *B60D 1/52* (2013.01); *B60D 1/485* (2013.01)

(58) Field of Classification Search
CPC .......... B60D 1/52; B60D 1/075; B60D 1/565; B60D 1/56; B60D 1/485; B60D 1/48; B60R 11/00; B60R 9/06
USPC .................. 248/205.1; 280/504, 500, 495
See application file for complete search history.

(56) References Cited

U.S. PATENT DOCUMENTS

| | | | | |
|---|---|---|---|---|
| 4,484,759 A * | 11/1984 | Zwick | B60D 1/56 | 280/460.1 |
| 6,457,733 B1 * | 10/2002 | Hansen | B60D 1/52 | 280/496 |
| 6,457,734 B1 * | 10/2002 | Hansen | B60D 1/143 | 280/481 |
| 6,502,845 B1 * | 1/2003 | Van Vleet | B60D 1/44 | 280/491.1 |
| 6,902,183 B2 * | 6/2005 | Rodgers | B60D 1/00 | 280/514 |
| 6,979,016 B1 * | 12/2005 | Wegener | B60D 1/56 | 280/495 |
| 7,222,873 B2 * | 5/2007 | Rodgers | B60D 1/52 | 280/495 |
| 8,257,014 B2 * | 9/2012 | Cullum | B60D 1/246 | 280/500 |
| 9,016,643 B2 * | 4/2015 | Sterling | B60D 1/58 | 248/316.1 |
| 9,914,332 B2 * | 3/2018 | Jordan | B60D 1/52 | |
| 11,752,816 B2 * | 9/2023 | Poston | B60D 1/485 | 280/495 |
| 2005/0275194 A1 * | 12/2005 | Wegener | B60D 1/56 | 280/500 |
| 2006/0186637 A1 * | 8/2006 | Scruggs | B60D 1/485 | 280/495 |
| 2011/0109063 A1 * | 5/2011 | Fudala | B60D 1/485 | 280/497 |
| 2020/0016946 A1 * | 1/2020 | Fabiano | B60D 1/485 | |
| 2021/0053406 A1 * | 2/2021 | Reinert | B60D 1/62 | |
| 2022/0324278 A1 * | 10/2022 | Poston | B62D 25/08 | |

* cited by examiner

*Primary Examiner* — Ingrid M Weinhold

(57) ABSTRACT

A vehicular utility mount system is provided which may utilize an elongate support beam having a first planar panel and a second planar panel. The first planar panel may be arranged orthogonal relative the second planar panel. The second planar panel may have an opening formed therethrough. The mount system may further utilize a hitch receiver disposed through the opening in the second planar panel. The mount system may also utilize a first coupling structure and a second coupling structure. The first coupling structure may be disposed at a first end of the elongate support beam and the second coupling structure may be disposed at a second end of the elongate support beam.

13 Claims, 9 Drawing Sheets

VEHICULAR UTILITY MOUNT SYSTEM

BACKGROUND OF THE INVENTION

Pickup trucks and sport utility vehicles with four-wheel drive often have two front tow hooks that extend through or just under the front bumper. In some cases, they also have two rear tow hooks. These hooks may be used to pull a vehicle out of difficult terrain such as mud, snow, or rough ground when it becomes stuck. A chain, cable, or strap may be attached to the tow hooks of the disabled vehicle and connected to another towing vehicle to aid in its extraction from the difficult terrain.

In some instances, use of the front tow hooks may be preferred over the rear tow hooks. For instance, the front tow hooks may be used if the vehicle becomes stuck in difficult terrain whereby the front tow hooks can be used to attach a winch or cable to pull itself out of difficult terrain. Further, front tow hooks may be used: as anchor points for off-road recovery equipment such as winches or ropes, as lifting points during maintenance or repair work on the vehicle, or as attachment points for snow plowing equipment such as plow blades. Overall, the front tow hooks provide a versatile and practical means of accessing and using the towing and recovery capabilities of a vehicle.

There are many instances in which owners of four-wheel drive vehicles want to attach a motorized winch to the front of their vehicle. However, the front bumpers installed by the original equipment manufacturer often prevent the attachment of the winch. As a result, the vehicle owner likely has to expend a significant amount of money and energy to replace the original front bumper with one that could accommodate the winch. Therefore, it would be advantageous to provide an attachment for mounting a winch-compatible hitch to an original equipment manufacturer bumper and tow hook assembly.

For front end winches, the use of a removable mounting system is desirable as it allows the user to quickly and easily remove the winch assembly when it is not needed or is unsafe to keep mounted, such as when using the vehicle for normal transportation on roadways. However, the removable mounting system should also provide a highly robust means of coupling to the vehicle frame such that it does not come uncoupled when the mounting system is put under load. Therefore, it would be advantageous to provide a mount system that provides the most robust means of coupling to the front tow hooks of the vehicle all while accommodating the unique shape of the tow hooks and bumper such that the mounting system is easily and iteratively removable therefrom as desired by the user.

Moreover, not all tow hooks are manufactured in a uniform manner nor are they fabricated onto vehicles in the same fashion. Specifically, the shape, diameter and thickness of the tow hook rings may vary in their construction and their arrangement and orientation when fabricated onto the vehicle frame may also vary. Further, the placement of the tow hooks relative the front bumper of the vehicle may preclude some mount systems from successfully coupling to the two hooks. Therefore, it would be advantageous to provide a mount system that accommodates as many of the variants of front tow hooks as possible while still maintaining a robust yet removable coupling thereto.

DETAILED DESCRIPTION OF THE INVENTION

Figure 1:
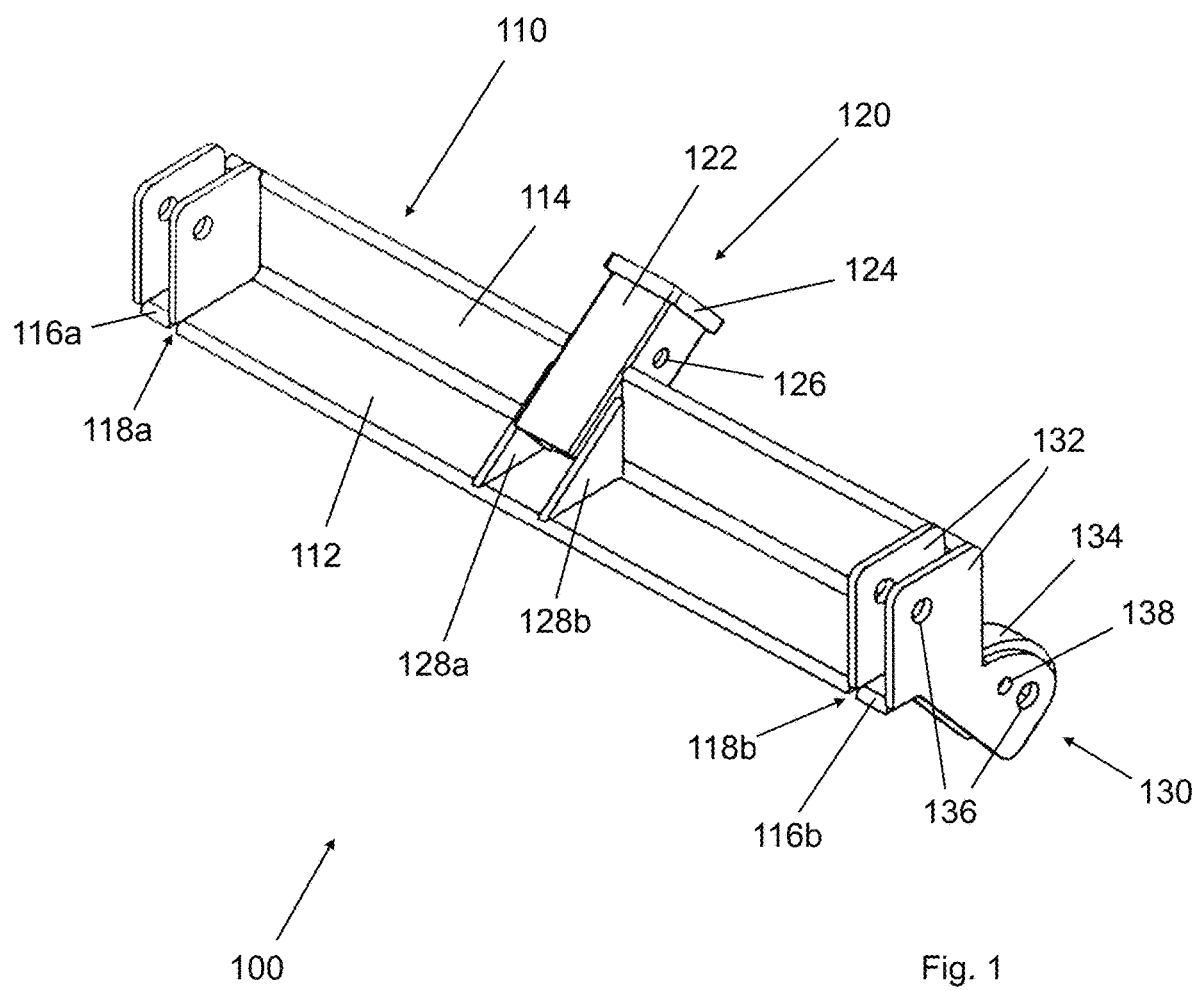
FIG. 1 illustrates a perspective view of a vehicular utility mount system in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "a vehicular utility mount system" also includes a plurality of vehicular utility mount systems and the like.

In some embodiments, a vehicular utility mount system is provided which comprises an elongate support beam having a first planar panel and a second planar panel, wherein the first planar panel is arranged orthogonal relative the second planar panel, and the second planar panel comprises an opening formed therethrough; a hitch receiver disposed through the opening in the second planar panel; and a first coupling structure and a second coupling structure, wherein the first coupling structure is disposed at a first end of the elongate support beam and the second coupling structure is disposed at a second end of the elongate support beam.

In some embodiments, the first planar panel comprises a first end portion disposed at the first end of the elongate support beam and a second end portion disposed at the second end of the elongate support beam.

In some embodiments, the first end portion is structurally separated from the first planar panel by a first panel gap and the second end portion is structurally separated from the first planar panel a second panel gap.

In some embodiments, the first end portion, the second end portion and the first planar panel are all aligned in a common plane.

In some embodiments, the vehicular utility mount system further comprises a plurality of vertical support panels.

In some embodiments, the plurality of vertical support panels are coupled to opposing sides of the hitch receiver.

In some embodiments, the plurality of vertical support panels are coupled to the first planar panel and the second planar panel.

In some embodiments, a first lengthwise edge of the first planar panel is coupled to a second lengthwise edge of the second planar panel.

In some embodiments, the first planar panel is structurally unitary, continuous, and monolithic with the second planar panel.

In some embodiments, the first lengthwise edge of the first planar panel is coupled via a common weld seam to the second lengthwise edge of the second planar panel.

In some embodiments, the hitch receiver comprises a hollow hitch body having a first side surface and a second side surface.

In some embodiments, a first vertical support panel is coupled to the first side surface and a second vertical support panel is coupled to the second side surface.

In some embodiments, a first locking pin aperture is disposed within the first side surface and a second locking pin aperture is disposed within the second side surface.

In some embodiments, the second planar panel is coupled to both of the first side surface and the second side surface.

In some embodiments, the hitch receiver comprises a proximal opening formed within a proximal end of the hollow hitch body and a distal opening formed within a distal end of the hollow hitch body.

In some embodiments, the hitch receiver comprises a perimeter lip disposed at the distal end of the hollow hitch body.

In some embodiments, the proximal opening is disposed adjacent the first planar panel.

In some embodiments, the opening is formed through a lengthwise midpoint of the second planar panel.

In some embodiments, a vehicular utility mount system is provided comprising an elongate support beam having a first planar panel and a second planar panel, wherein the first planar panel is arranged orthogonal relative the second planar panel, and the second planar panel comprises an opening formed therethrough; a hitch receiver disposed through the opening in the second planar panel, wherein the hitch receiver comprises a hollow hitch body having a first side surface and a second side surface, a first locking pin aperture is disposed within the first side surface and a second locking pin aperture is disposed within the second side surface, the hollow hitch body comprises a proximal opening and a distal opening, and the proximal opening is disposed adjacent the first planar panel; and a first coupling structure and a second coupling structure, wherein the first coupling structure is disposed at a first end of the elongate support beam and the second coupling structure is disposed at a second end of the elongate support beam.

In some embodiments, a vehicular utility mount system is provided comprising an elongate support beam having a first planar panel and a second planar panel, wherein the first planar panel is arranged orthogonal relative the second planar panel, a first lengthwise edge of the first planar panel is coupled to a second lengthwise edge of the second planar panel, the first planar panel is structurally unitary, continuous, and monolithic with the second planar panel, and the second planar panel comprises an opening formed through a lengthwise midpoint of the second planar panel; a hitch receiver disposed through the opening in the second planar panel; and a first coupling structure and a second coupling structure, wherein the first coupling structure is disposed at a first end of the elongate support beam and the second coupling structure is disposed at a second end of the elongate support beam.

Exemplary embodiments of the present invention are illustrated in the accompanying figures. As shown in FIG. 1, a perspective view of a vehicular utility mount system 100 is provided. The vehicular utility mount system 100 may comprise an elongate support beam 110, a hitch receiver 120, and a plurality of coupling structures 130. The elongate support beam 110 may provide structural support for each of the hitch receiver 120, the plurality of coupling structures 130 and associated structural elements of each.

Specifically, the elongate support beam 110 may comprise a first planar panel 112 coupled to a second planar panel 114 such that the first and second planar panels 112, 114 are adjoined in an orthogonal orientation relative one another. Further, the first and second planar panels 112, 114 may be adjoined along adjacent lengthwise edges of each as shown in FIG. 1. Preferably, the first planar panel 112 may be structurally unitary, continuous, and monolithic with the second planar panel 114 in order to maximize the strength of the bond therebetween for better performance under heavier loads. Alternatively, the adjoining of the first and second planar panels 112, 114 may be accomplished via welding each of the side edges to one another using a fillet welding seam, a corner outside seam, and like welding seams or any combinations thereof.

Additionally, the elongate support beam 110 may comprise first and second end portions 116a, 116b adjacent the first planar panel 112. Specifically, the first and second end portions 116a, 116b may be aligned in a common plane with the first planar panel 112 but separated therefrom via respective first and second panel gaps 118a, 118b which serve to structurally delineate the end portions 116a, 116b from the first planar panel 112 within the common plane. Each of the first and second end portions 116a, 116b may be aligned with the lengthwise terminal ends of the second planar panel 114, as illustrated in FIG. 1, such that the collective lengthwise dimension of the first planar panel 112, the first and second panel gaps 118a, 118b, and the first and second end portions 116a, 116b is equal to the lengthwise dimension of the second planar panel 114.

The second planar panel 114 of the elongate support beam 110 may comprise an opening centered about the midpoint of the second planar panel 114. The opening may be shaped to structurally accommodate the shape of the hitch receiver 120 to be disposed therethrough. The hitch receiver 120 may be secured to the first and second planar panels 112, 114 via first and second vertical support panels 128a, 128b. Specifically, the vertical support panels 128a, 128b may be permanently coupled to each of the first planar panel 112, the second planar panel 114, the coupling joint of the first and second planar panels 112, 114, and the hitch receiver 120.

The hitch receiver 120 may comprise a hollow hitch body 122 having a proximal opening and a distal opening. A perimeter lip 124 may be disposed adjacent the distal opening and around the terminal end of the hollow hitch body 122 in order to assist positioning an external hitch within the hollow hitch body 122. Upon positioning the external hitch within the hollow hitch body 122, a locking pin aperture 126 may be aligned with an aperture within the external hitch in order to insert a locking pin therein to robustly yet removably secure the external hitch to the hitch receiver 120 via the hollow hitch body 122. The locking pin aperture 126 may be formed through two parallel sides of the hollow hitch body 122 which therefore creates two apertures within the structure thereof.

The plurality of coupling structures 130 may be disposed at the lengthwise terminal ends of the elongate support beam 110 and coupled thereto via welding using a fillet welding seam, a corner outside seam, and like welding seams or any combinations thereof. Specifically, each coupling structure 130 may comprise a plurality of support panels 132 which are coupled together via a curved sheath structure 134 that spans a curved section of each of the support panels 132. Further, each of the support panels 132 comprise a plurality of apertures 136, 138. The plurality of apertures 136, 138 may comprise at least one large diameter aperture and at least one small diameter aperture.

The support panels 132 may be oriented in parallel relative one another such that a first of the support panels 132 is coupled to the terminal end of the elongate support beam 110 and the second of the support panels 132 is coupled within one of the panel gaps 118a, 118b. Additionally, both of the support panels 132 may be coupled to both of the first planar panel 112 and the second planar panel 114. Further, the curved sheath structure 134 may also be coupled to the second planar panel 114. All of the structural elements associated with the coupling structures 130 that are coupled together may be done so via welding using a fillet welding seam, a corner outside seam, and like welding seams or any combinations thereof.

Figure 2A:
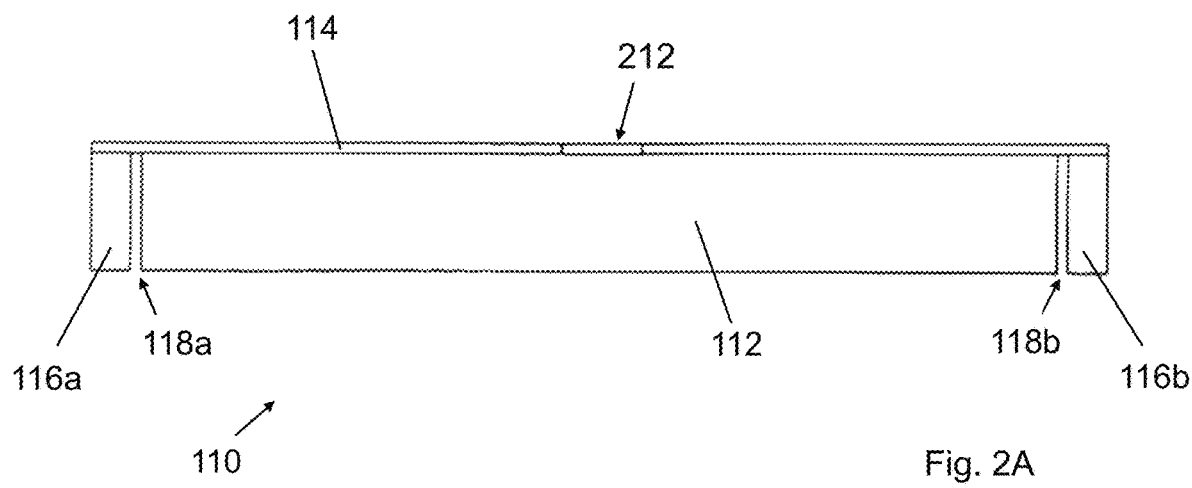
FIG. 2A illustrates a plan view of an elongate support beam of a vehicular utility mount system in accordance with some embodiments of the present invention.

As shown in FIG. 2A, a plan view of an elongate support beam 110 of a vehicular utility mount system is provided. The elongate support beam 110 may comprise a first planar panel 112 coupled to a second planar panel 114 such that the first and second planar panels 112, 114 are adjoined in an orthogonal orientation relative one another. Further, the first and second planar panels 112, 114 may be adjoined along one of the side edges of each as shown in FIG. 2A. Preferably, the first planar panel 112 may be structurally unitary, continuous, and monolithic with the second planar panel 114 in order to maximize the strength of the bond therebetween for better performance under heavier loads. Alternatively, the adjoining of the first and second planar panels 112, 114 may be accomplished via welding each of the side edges to one another using a fillet welding seam, a corner outside seam, and like welding seams or any combinations thereof. While the first and second planar panels 112, 114 are illustrated in FIG. 2A as being nearly exactly orthogonal relative one another, it is understood that the orientation between the first and second planar panels 112, 114 may be within +/−10 degrees of orthogonal relative one another in order to properly align the vehicular utility mount system with the front tow hooks of a user's vehicle.

Additionally, the elongate support beam 110 may comprise first and second end planar panels 116a, 116b adjacent the first planar panel 112. Specifically, the first and second end planar panels 116a, 116b may be aligned in a common plane with the first planar panel 112 but separated therefrom via respective first and second panel gaps 118a, 118b which serve to structurally delineate the end planar panels 116a, 116b from the first planar panel 112 within the common plane. The first and second panel gaps 118a, 118b may be defined by the distance between the adjacent terminal endpoints of the first and second end planar panels 116a, 116b and the first planar panel 112. That distance may be equivalent to the thickness of one of the plurality of support panels 132 of FIG. 1 such that the given support panel may snugly fit within the given panel gap.

Each of the first and second end planar panels 116a, 116b may be aligned with the lengthwise terminal ends of the second planar panel 114, as illustrated in FIG. 2A, such that the collective lengthwise dimension of the first planar panel 112, the first and second panel gaps 118a, 118b, and the first and second end planar panels 116a, 116b is equal to the lengthwise dimension of the second planar panel 114. Thereby, there may be structural symmetry between the second planar panel 114 and collectively the first planar panel 112, the first and second panel gaps 118a, 118b, and the first and second end planar panels 116a, 116b. Such structural symmetry allows the coupling between the vehicular utility mount system and the front tow hooks of a user's vehicle to be robust and stable which provides the user the ability to more easily drive while a hitch is inserted within the hitch receiver of the vehicular utility mount system.

Further, an opening 212 centered about the lengthwise midpoint of the second planar panel 114 may be formed therein as shown in FIG. 2A. The opening 212 may be shaped to accept a hitch receiver therein. While the opening 212 is illustrated here as being rectangular, it is understood that the opening 212 may be shaped to match that of the hitch receiver and therefore may be not only rectangular but also triangular, circular, ovular, square and the like or any combination thereof. Also, it is important that the opening 212 be located at the lengthwise midpoint of the second planar panel 114 in order to provide symmetry between the vehicular utility mount system and a hitch received therein so that the hitch may remain coupled in a stable manner while the user drives their vehicle.

Figure 2B:
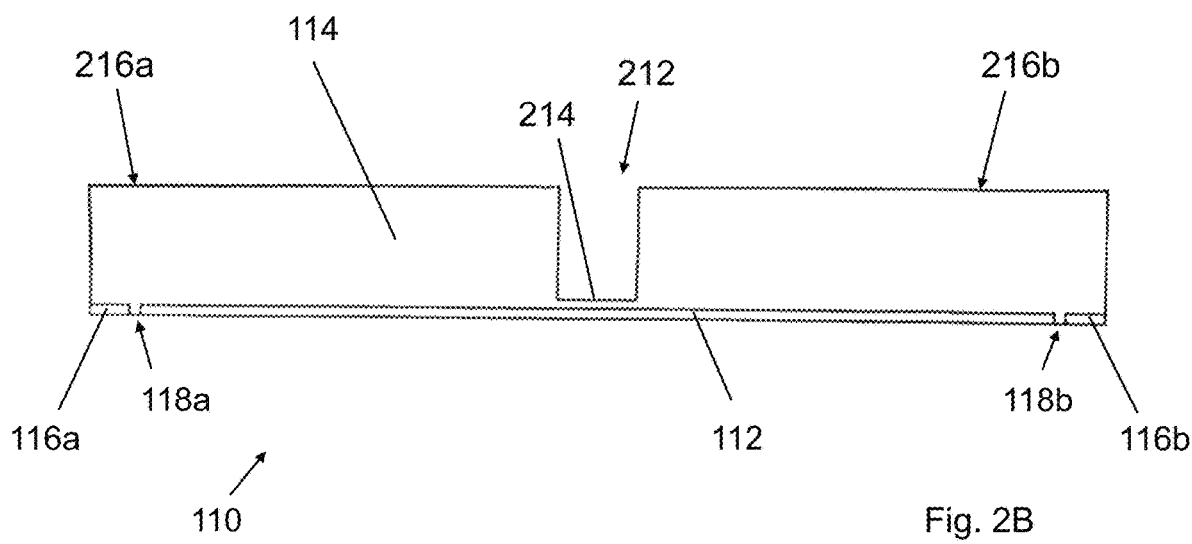
FIG. 2B illustrates an elevational view of an elongate support member of a vehicular utility mount system in accordance with some embodiments of the present invention.

As shown in FIG. 2B, an elevational view of an elongate support member 110 of a vehicular utility mount system is provided. The elongate support member 110 may be identical to that of the elongate support member 100 illustrated and described with respect to FIG. 2A. However, the elevational view of FIG. 2B clearly illustrates the opening 212 as having a rectangular shape, though it is understood that the opening 212 may be shaped to match that of the hitch receiver and therefore may be not only rectangular but also triangular, circular, ovular, square and the like or any combination thereof.

Further, the elevational view of FIG. 2B illustrates a connective elongate member 214 that acts as a reinforcing support member that connects a first portion 216a of the second planar panel 114 and a second portion 216b of the second planar panel 114. Specifically, the connective elongate member 214 may be structurally unitary, monolithic and continuous with the first and second portions 216a, 216b of the second planar panel 114. Further, the shape of the connective elongate member 214 may be partly defined by the opening as shown in FIG. 2B. Additionally, the shape of the connective elongate member 214 may be partly defined by the coupling joint adjoining the first planar panel 112 and the second planar panel 114. Without the connective elongate member 214, the second planar panel 114 would have a smaller surface area of coupling joint with the first planar panel 112 and, therefore, would have a less robust coupling arrangement thereto.

Figure 3:
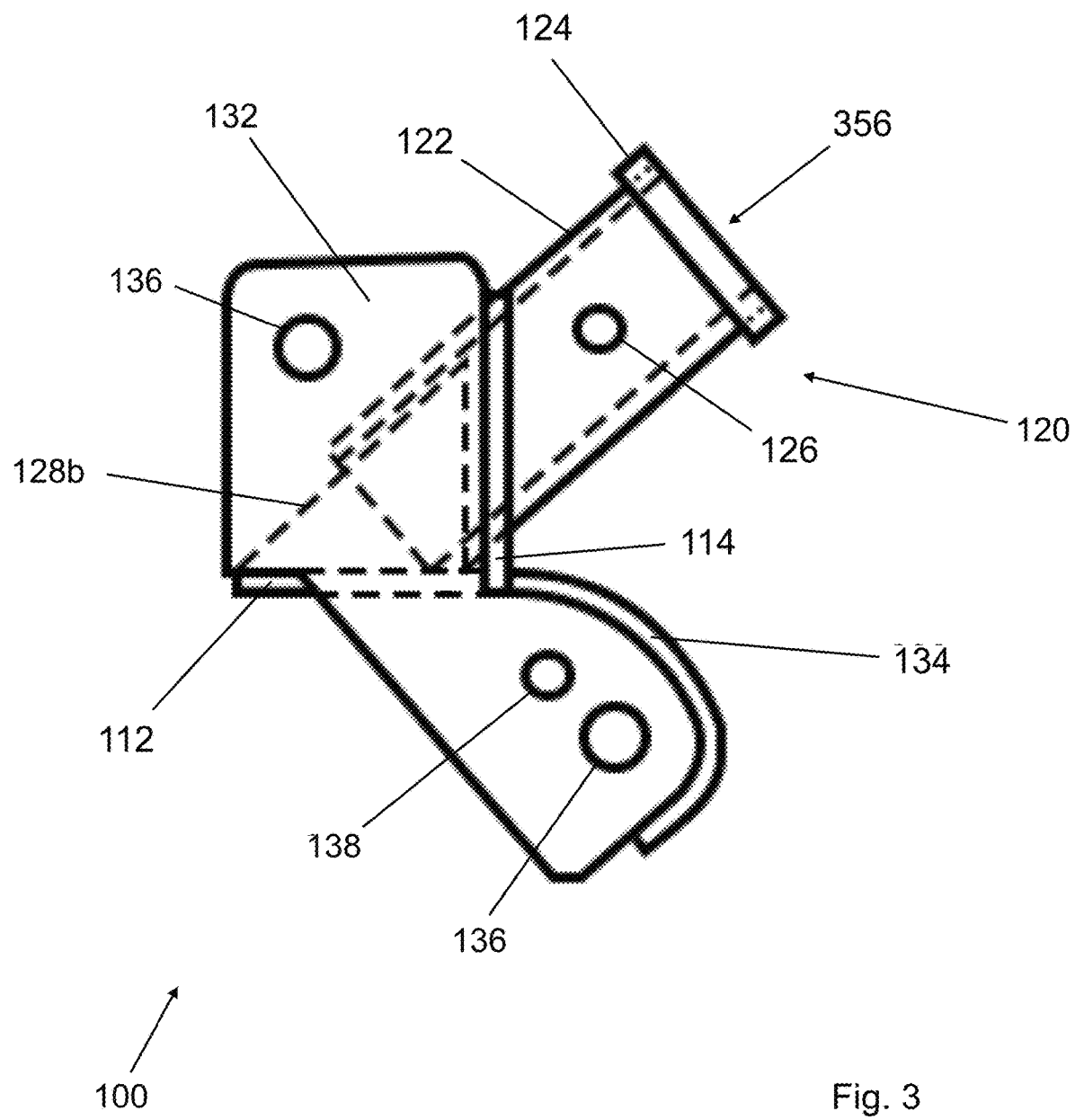
FIG. 3 illustrates a side view of a vehicular utility mount system with some hidden structural elements depicted in phantom in accordance with some embodiments of the present invention.

As shown in FIG. 3, a side view of a vehicular utility mount system 100 with some hidden structural elements depicted in phantom is provided. The vehicular utility mount system 100 may be identical to that of the vehicular utility mount system 100 illustrated and described with respect to FIG. 1. However, the side view of the vehicular utility mount system 100 of FIG. 3 shows a more detailed disclosure of the axial alignment of the various structural elements of the vehicular utility mount system including the hitch receiver and the coupling structures.

Specifically, the vehicular utility mount system 100 may comprise a first planar panel 112 adjoined to a second planar panel 114. Preferably, the first planar panel 112 may be structurally unitary, continuous, and monolithic with the second planar panel 114 in order to maximize the strength of the bond therebetween for better performance under heavier loads. Alternatively, the panels 112, 114 may be adjoined using a welding technique such as a fillet welding seam, a corner outside seam, and like welding seams or any combinations thereof. Additionally, a plurality of vertical support panels 128a, 128b (shown in phantom) may also couple together the first and second planar panels 112, 114 via similar or the same welding technique and thereby may be integrated into the coupling joint between the first and second planar panels 112, 114. Further, the vertical support panels 128a, 128b may be disposed on either side of a hitch receiver 120 in order to align it with the remainder of the vehicular utility mount system 100 such that the vertical support panels 128a, 128b are coupled to the hitch receiver 120 via similar or the same welding technique.

It is understood that the vertical support panels 128a, 128b may take any suitable shape to accommodate the alignment of the hitch receiver 120. However, FIG. 3 illustrates the vertical support panels 128a, 128b as having a triangular shape. The triangular shape is advantageous over other shapes as it allows the vertical support panels 128a, 128b to be coupled to the first and second planar panels 112, 114 along the base sides of the triangular panels 128a, 128b while the hypotenuse side of the triangular panels 128a, 128b aligns with the angular orientation of the hitch receiver 120. In other words, the angular orientation of the hitch receiver 120 relative the first planar panel 112 may be similar or identical to the angle of the triangular shape of the vertical support panels 128a, 128b that is adjacent the first planar panel 112. Thereby, the triangular shape of the vertical support panels 128a, 128b is superior to other shapes, such as rectangular or circular, as it provides structural support to each of the first planar panel 112, the second planar panel 114, and the hitch receiver 120 while not utilizing any more fabrication material than necessary to accomplish as much.

The second planar panel 114 may have a curved sheath structure 134 coupled thereto and extending therefrom. Specifically, the curved sheath structure 134 may be welded to an outer surface of the second planar panel 114 that is opposite the outer surface to which the first planar panel 112 is welded as illustrated in FIG. 3. The welding may be achieved via a welding technique such as a fillet welding seam, a corner outside seam, and like welding seams or any combinations thereof. Further, the curved sheath structure 134 comprises a curvature that conforms to the curvature of a portion of a coupling structure 130 such that the curved sheath structure 134 may be welded to the exterior of the coupling structure 130 as illustrated in FIG. 3. The curved sheath structure 134 in combination with the coupling structure 130 may be utilized to act as a structural sheath for coupling the vehicular utility mount system 100 to a pair of front tow hooks of a user vehicle.

Moreover, the coupling structure 130 may comprise a plurality of apertures 136, 138 formed therein which are designed to accept a variety of locking pins therein in order to robustly secure the curved sheath structure 134 and the coupling structure 130 to the front tow hooks of the user vehicle. Specifically, a locking pin may be inserted first through the aperture 136 of a first coupling structure 130, next through an aperture in a first tow hook, and finally through the aperture 136 of a second coupling structure 130 that is aligned parallel with the first coupling structure 130 such that the first and second coupling structures 130 are arranged on either side of the first tow hook of the user vehicle.

Further, the aperture 138 of the first coupling structure 130 may have a locking pin that is inserted first therethrough and then through an aperture 138 of the second coupling structure 130 in order to prevent the rotation of the vehicular utility mount system 100 about the axis running axially through the locking pin inserted into the aperture 136. This prevention of rotation assists in stabilizing the vehicular utility mount system 100 when it has an external hitch inserted into a hitch receiver 120. Similarly, the aperture 136 of the first coupling structure 130 may have a locking pin that is inserted first therethrough and then through an aperture 136 of the second coupling structure 130 in order to provide structural stabilization of the first and second coupling structures 130 aligned in parallel.

The hitch receiver 120 is illustrated in FIG. 3 as extending through an opening in the second planar panel 114 at a roughly 45 degree angle relative the horizontally-oriented first planar panel 112 and at a roughly 45 degree angle relative the vertically-oriented second planar panel 114. Given that the hitch receiver 120 is retained in this orientation via the triangular vertical support panels 128a, 128b on either side thereof, the triangular shape of the panels 128a, 128b may be a right isosceles triangle to accommodate a flush coupling to the roughly 45 degree orientation relative the first and second planar panels 112, 114.

Moreover, the hitch receiver 120 may comprise a hollow hitch body 122 having a proximal opening and a distal opening 356. A perimeter lip 124 may be disposed adjacent the distal opening 356 and around the terminal end of the hollow hitch body 122 in order to assist positioning an external hitch within the hollow hitch body 122. Upon positioning the external hitch within the hollow hitch body 122 via the distal opening 356, a locking pin aperture 126 may be aligned with an aperture within the external hitch in order to insert a locking pin therein to robustly yet removably secure the external hitch to the hitch receiver 120 via the hollow hitch body 122 and the distal opening 356.

Figure 4:
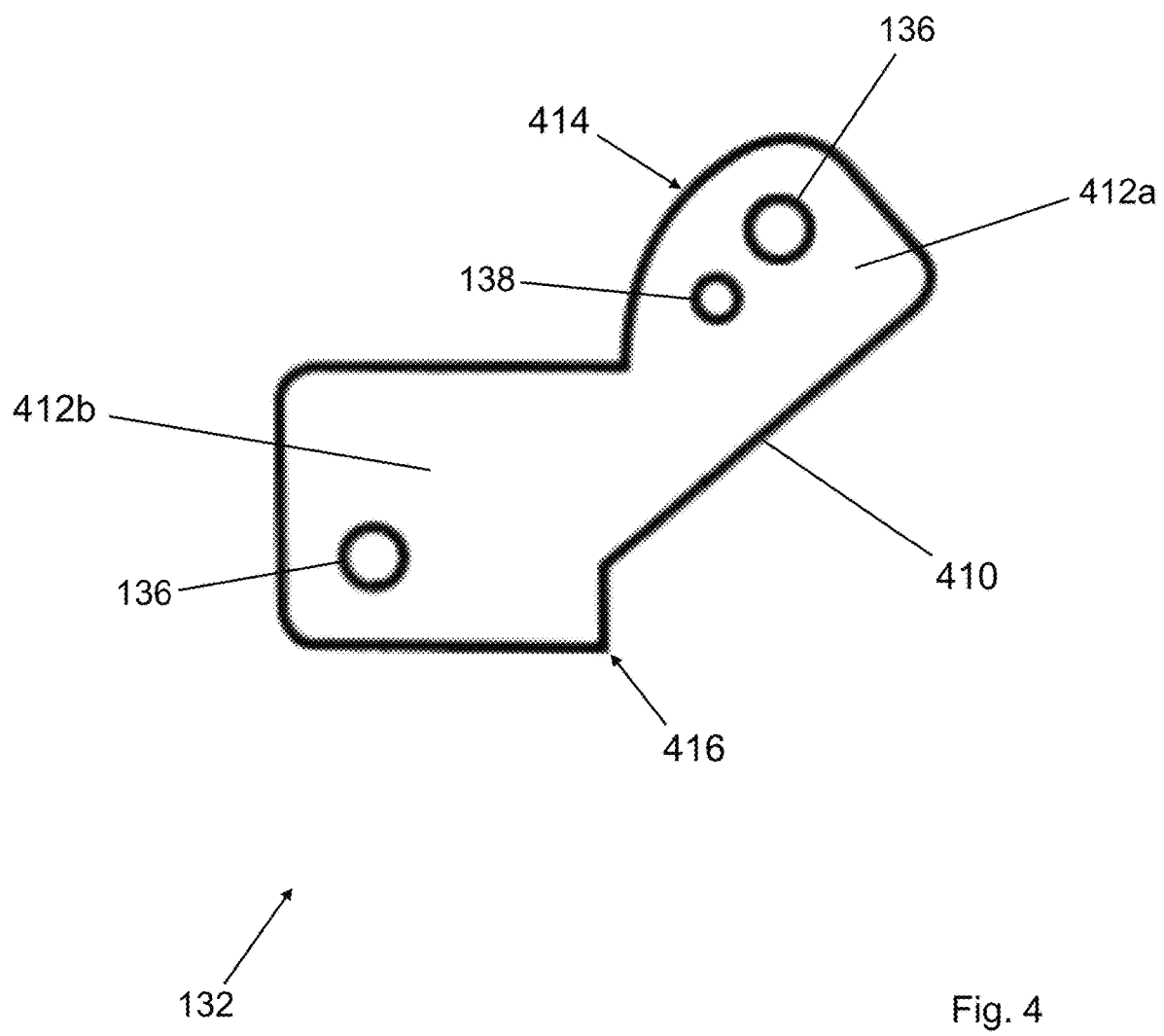
FIG. 4 illustrates a plan view of a support panel of a coupling structure of a vehicular utility mount system in accordance with some embodiments of the present invention.

As shown in FIG. 4, a plan view of a support panel 132 of a coupling structure of a vehicular utility mount system is provided. The support panel 132 may comprise an outer body structure 410 defined by an outer surface of the panel 132. The outer body structure 410 may comprise a first portion 412a disposed at a first end and a second portion 412b disposed at a second end opposite the first end. The first portion 412a may comprise a convex curvature 414 that extends from the other two orthogonal sides of the first portion 412a.

The second portion 412b of the outer body structure 410 may comprise a generally rectangular shape with a right angle corner 416 disposed at a juncture of the first and second portions 412a, 412b. Similarly, the convex curvature 414 of the first portion 412a may terminate at this juncture of the first and second portions 412a, 412b. With regard to the orientation of FIG. 4, this termination point of the convex curvature 414 is illustrated as being laterally displaced from the location of the right angle corner 416. The lateral distance of this displacement may be equal to the thickness of the first planar panel previously described with respect to FIGS. 1-3.

Such a correlation between the displacement distance and panel thickness allows the first planar panel to be disposed adjacent the right angle corner 416. This structural orientation is illustrated in FIG. 3 with respect to the first planar panel 112. Further, this correlation between the displacement distance and panel thickness allows the curved sheath structure 134 of FIG. 3 that is disposed over the coupling structure 130 to terminate at a position level with that of the first planar panel 112 as illustrated in FIG. 3.

It is understood that the exact shape of the support panel 132 may deviate from that illustrated in FIG. 4 while still being encompassed by the scope of the present invention. However, it is advantageous that the convex structure 414 comprises a similar shape as that shown in FIG. 4 given the generally uniform size and ring-shaped structure of most front tow hooks of vehicles to which the vehicular utility mount system may be coupled. Similarly, it is advantageous that the diameter of the of the aperture 136 be sized to match that of the diameter of the aperture in the ring-shaped tow hooks so that the largest possible diameter locking pin may be inserted flush with each aperture to provide the most robust coupling therebetween. Additionally, the length and width dimensions of the second portion 412b may match (within a 10% error range) that of the first and second planar panels illustrated and described with respect to FIG. 3 in order to allow robust coupling via weld seams therebetween.

The outer body structure 410 may further comprise a plurality of apertures 136, 138. The aperture 136 may be disposed within the second portion 412b of the outer body structure 410 while the apertures 136, 138 may be disposed within the first portion 412a of the outer body structure 410. The plurality of apertures 136, 138 are designed to accept a variety of locking pins therein in order to robustly secure the curved sheath structure 134 of FIG. 3 and the coupling structure 130 to the front tow hooks of a user vehicle.

For instance, a first locking pin may be inserted first through the aperture 136 of a first coupling structure, next through an aperture in a first tow hook, and finally through the aperture 136 of a second coupling structure that is aligned in parallel with the first coupling structure such that the first and second coupling structures are arranged on either side of the first tow hook of the user vehicle. In order to prevent rotation of the vehicular utility mount system about an axis running axially through the first locking pin within the aperture 136, the aperture 138 of the first coupling structure may have a second locking pin that is inserted first therethrough and then through an aperture 138 of the second coupling structure. Similarly, the aperture 136 of the first coupling structure may have a third locking pin that is inserted first therethrough and then through an aperture 136 of the second coupling structure in order to provide structural stabilization of the first and second coupling structures aligned in parallel relative one another.

Figure 5:
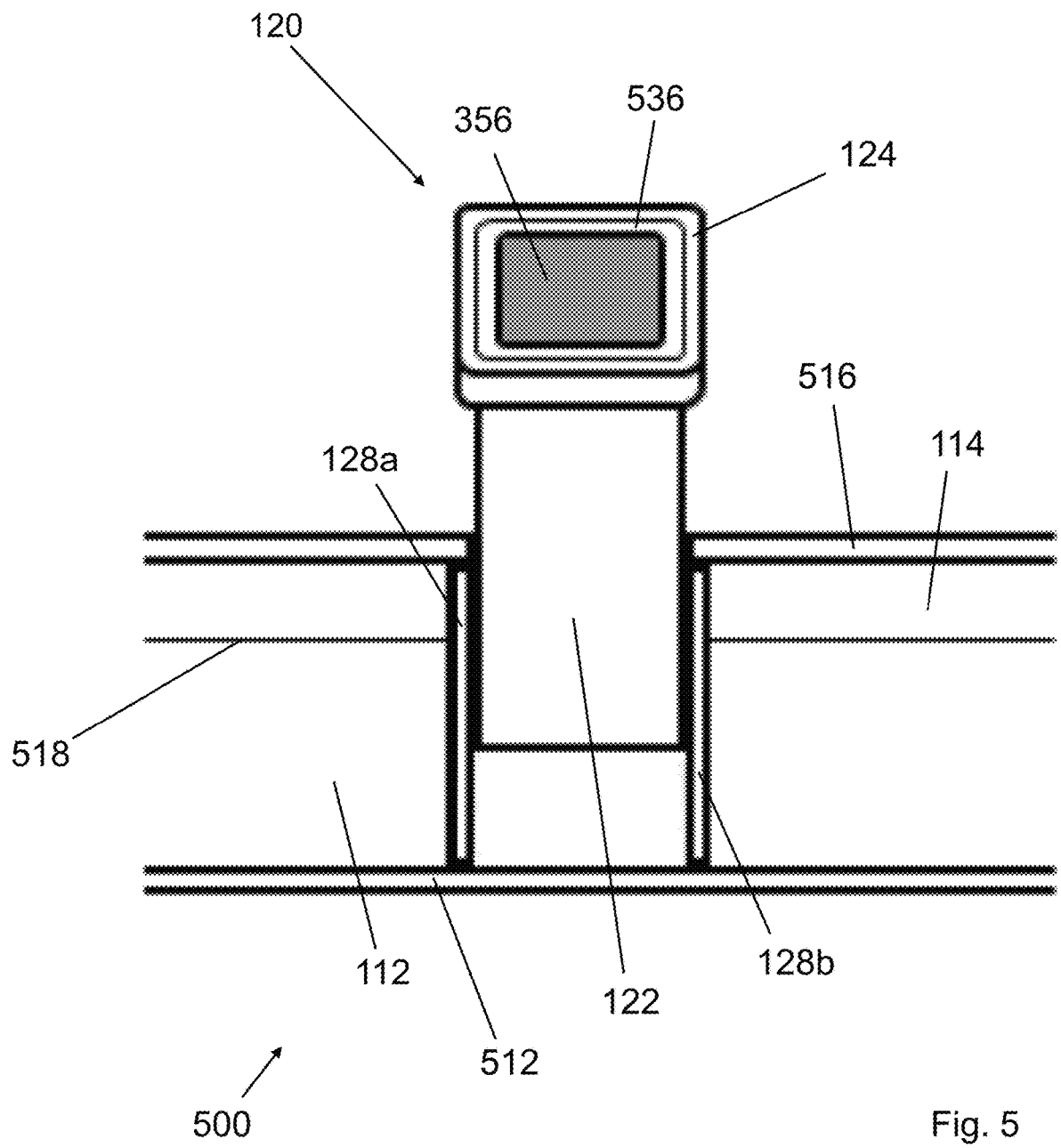
FIG. 5 illustrates a detailed elevational overhead view of a central portion of a vehicular utility mount system in accordance with some embodiments of the present invention.

As shown in FIG. 5, a detailed elevational overhead view of a central portion 500 of a vehicular utility mount system is provided. The central portion 500 of the vehicular utility mount system may comprise a first planar panel 112 having a first lengthwise edge surface 512 and a second planar panel 114 having a second lengthwise edge surface 516. The first and second planar panels 112, 114 may be adjoined along their lengthwise edges via a common coupling joint 518. Preferably, the first planar panel 112 may be structurally unitary, continuous, and monolithic with the second planar panel 114 in order to maximize the strength of the bond therebetween for better performance under heavier loads. Alternatively, the first and second planar panels 112, 114 may be adjoined using a welding technique such as a fillet welding seam, a corner outside seam, and like welding seams or any combinations thereof.

The first and second planar panels 112, 114 may further be secured together via vertical support panels 128a, 128b which are disposed upon opposing sides of a hitch receiver 120 as shown in FIG. 5. The vertical support panels 128a, 128b may be coupled across the entire width of the first planar panel 112 and the entire width of the second planar panel 114 such that the panels 128a, 128b may further adjoin with the coupling joint 518. The vertical support panels 128a, 128b may be coupled to these structures using a welding technique such as a fillet welding seam, a corner outside seam, and like welding seams or any combinations thereof.

The hitch receiver 120 may comprise an hollow hitch body 122 that extends from a distal end of the receiver 120 to a proximal end of the receiver 120. The hollow hitch body 122 may terminate at the distal end in the form of a perimeter lip 124. In one embodiment, the perimeter lip 124 may be structurally unitary, monolithic and continuous with the structure of the hollow hitch body 122 such that the perimeter lip 124 may be a terminal end of the body 122 that is crimped back thereupon to form the structure of the lip 124.

Alternatively, the perimeter lip 124 may be structurally separate and discontinuous from the structure of the hollow hitch body 122 such that the lip 124 is welded to the outer surface at the distal end of the body 122. In either embodiment, an inner body 536 may be disposed in parallel along the interior of the hollow hitch body 122 such that the inner body 536 is welded to the hollow hitch body 122. Advantageously, the inner body 536 may serve as a reinforcing structure for the hollow hitch body 122 when an external hitch is secured therein and an associated load is supported thereupon.

The hitch receiver 120 may further comprise a distal opening 356 within the hollow hitch body 122 as well as a proximal opening (not shown) adjacent the first planar panel 112. The distal opening 356 is structured to receive the external hitch therethrough with the using the perimeter lip 124 as a guidance structure for alignment. The shape of the distal opening 356 may be defined by the shape of the hollow hitch body 122 and/or the shape of the inner body 536.

Figure 6:
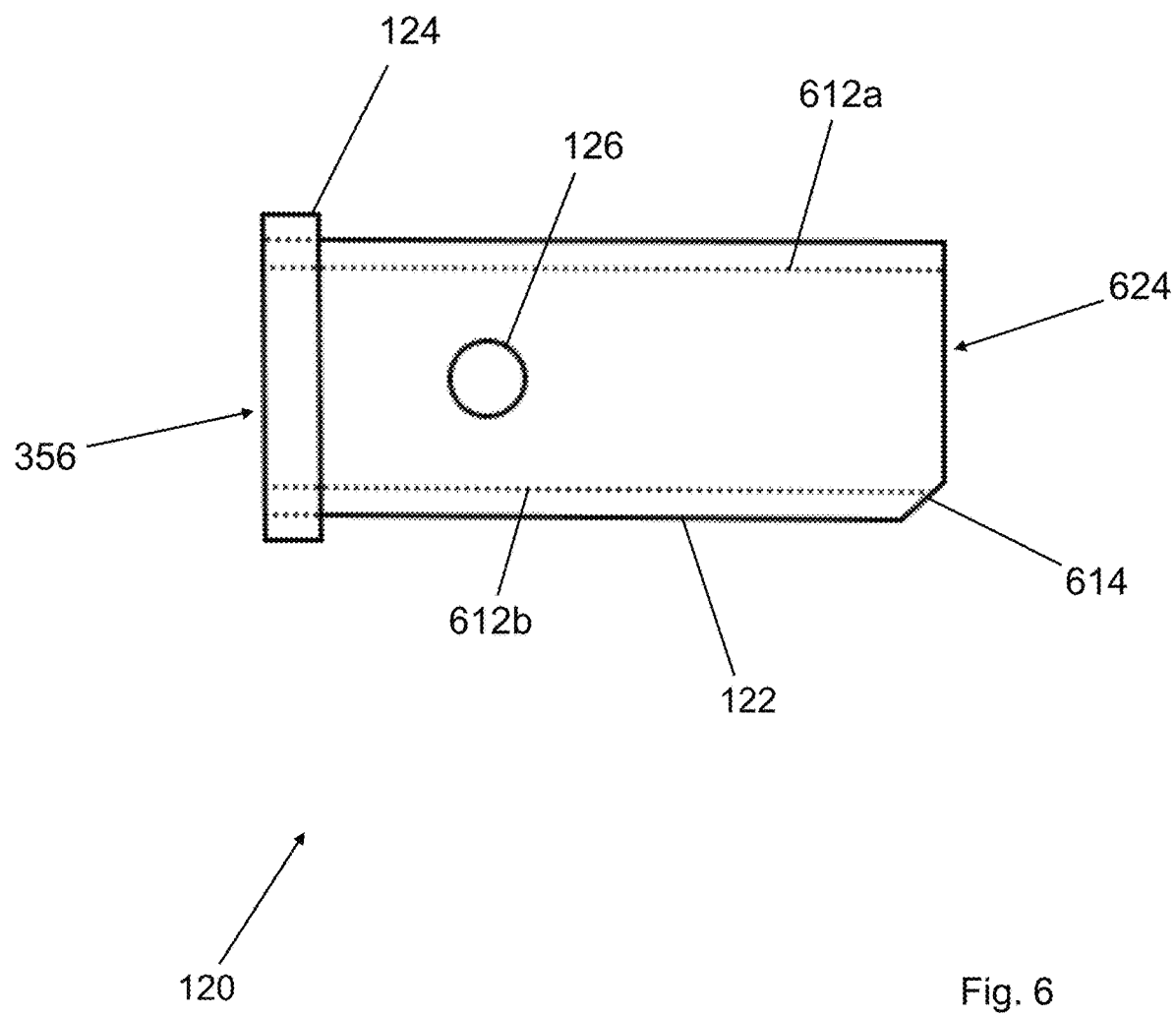
FIG. 6 illustrates a detailed side view of a hitch receiver of a vehicular utility mount system with hidden structural elements depicted in phantom in accordance with some embodiments of the present invention.

As shown in FIG. 6, a detailed side view of a hitch receiver 120 of a vehicular utility mount system with hidden structural elements depicted in phantom is provided. The hitch receiver 120 may comprise an outer body surface and an inner body surface with a first side 612a and a second side 612b. The outer body surface may have a shape partly defined by a corner notch 614, an aperture 126, a perimeter lip 124, a distal opening 356 and a proximal opening 624.

The corner notch 614 may be disposed adjacent the second side 612b of the inner body surface and defined by a removal of a corner of the shape of the outer body surface as illustrated in FIG. 6. Specifically, the flat surface of the corner notch 614 may be disposed adjacent the first planar panel 112 of FIG. 3 as illustrated therein in order to serve as means of stabilizing the hitch receiver 120 against the panel 112 which provides a more robust structural integrity to the vehicular utility mount system when under equipment load from an external hitch inserted within the hitch receiver 120. The adjoining of the flat surface of the corner notch 614 with the first planar panel 112 of FIG. 3 may be accomplished via welding using a welding technique such as a fillet welding seam, a corner outside seam, and like welding seams or any combinations thereof.

The inner body surface may define a cavity therein which terminates on either end at the distal and proximal openings 356, 624. The second side 612b of the inner body surface is advantageously disposed adjacent the first planar panel 112 of FIG. 3 while the first side 612a is disposed away from the panel 112 in order to allow the corner notch 614 to abut the panel 112 for welding thereto. Further, this orientation is also advantageous in that it allows the aperture 126 to be arranged in a manner that it aligns with the apertures of an external hitch which are generally aligned in the horizontal manner. Therefore, vertical arrangement of the aperture 126 would render the hitch receiver incompatible with most external hitches that might otherwise be compatible with it.

As illustrated in FIG. 6, the outer body surface and the first and second sides 612a, 612b of the inner body surface may extend through the interior cavity of the perimeter lip 124 defined by the distal opening 356. In one embodiment, the perimeter lip 124 may be structurally unitary, monolithic and continuous with the structure of the outer body surface. Alternatively, the perimeter lip 124 may be structurally separate and discontinuous from the structure of the outer body surface such that the lip 124 is welded thereto adjacent the distal opening 356.

Figure 7A:
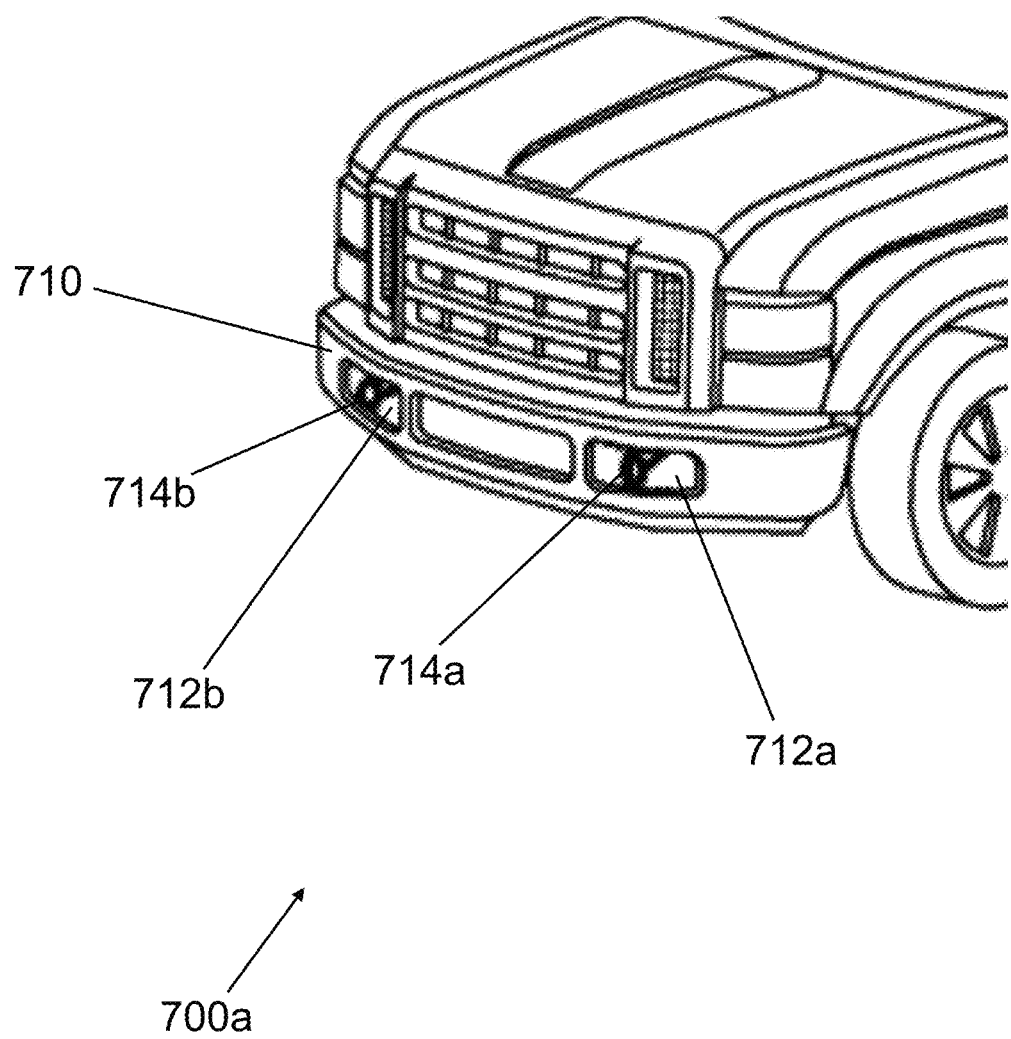
FIG. 7A illustrates a perspective overview of an anterior portion of a vehicle with a pair of front tow hooks for coupling to a vehicular utility mount system in accordance with some embodiments of the present invention.

As shown in FIG. 7A, a perspective overview of an anterior portion of a vehicle 700a with a pair of front tow hooks 714a, 714b for coupling to a vehicular utility mount system is provided. The anterior portion of a vehicle 700a may comprise a bumper 710 having a first bumper opening 712a and a second bumper opening 712b. Within the first bumper opening 712a may be disposed a first tow hook 714a of the pair of tow hooks while a second tow hook 714b of the pair of tow hooks may be disposed within the second bumper opening 712b.

As illustrated in FIG. 7A, the first and second tow hooks 714a, 714b may be shaped as circular rings with apertures disposed therethrough. Further, the circular rings may be oriented along a vertical axis such that the apertures may be aligned along a horizontal axis. Each of the circular rings may be supported by respective elongate support members that allow each of the first and second tow hooks 714a, 714b to be exposed out of the front of the bumper 710 via the first and second bumper openings 712a, 712b.

Figure 7B:
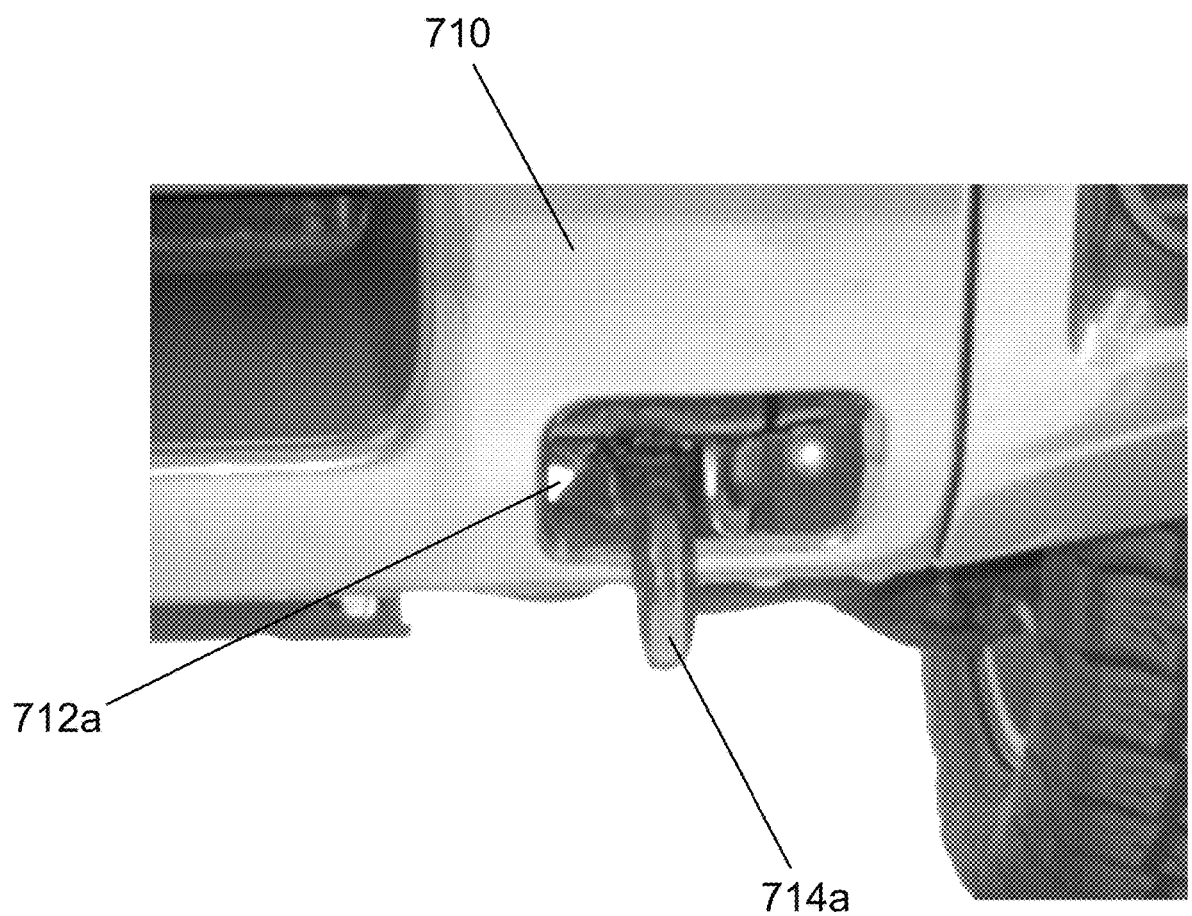
FIG. 7B illustrates a detailed elevational view of a front tow hook of a vehicle for coupling to a vehicular utility mount system in accordance with some embodiments of the present invention.

As shown in FIG. 7B, a detailed elevational view of a front tow hook 714a of an anterior portion of a vehicle 700b for coupling to a vehicular utility mount system is provided. The vehicle 700b may comprise a bumper 710 having a first bumper opening 712a disposed therein. Within the first bumper opening 712a may be disposed the front tow hook 714a. As illustrated in FIG. 7B, the front tow hook 714a may be shaped as a vertically-oriented circular ring having a horizontally-oriented aperture therethrough. Thereby, the coupling structure 130 of FIG. 1 may be structurally complementary with the circular ring shape of the front tow hook 714a such that the coupling structure 130 may be disposed over and around the circular ring of the front tow hook 714a as illustrated in FIG. 8.

Figure 8:
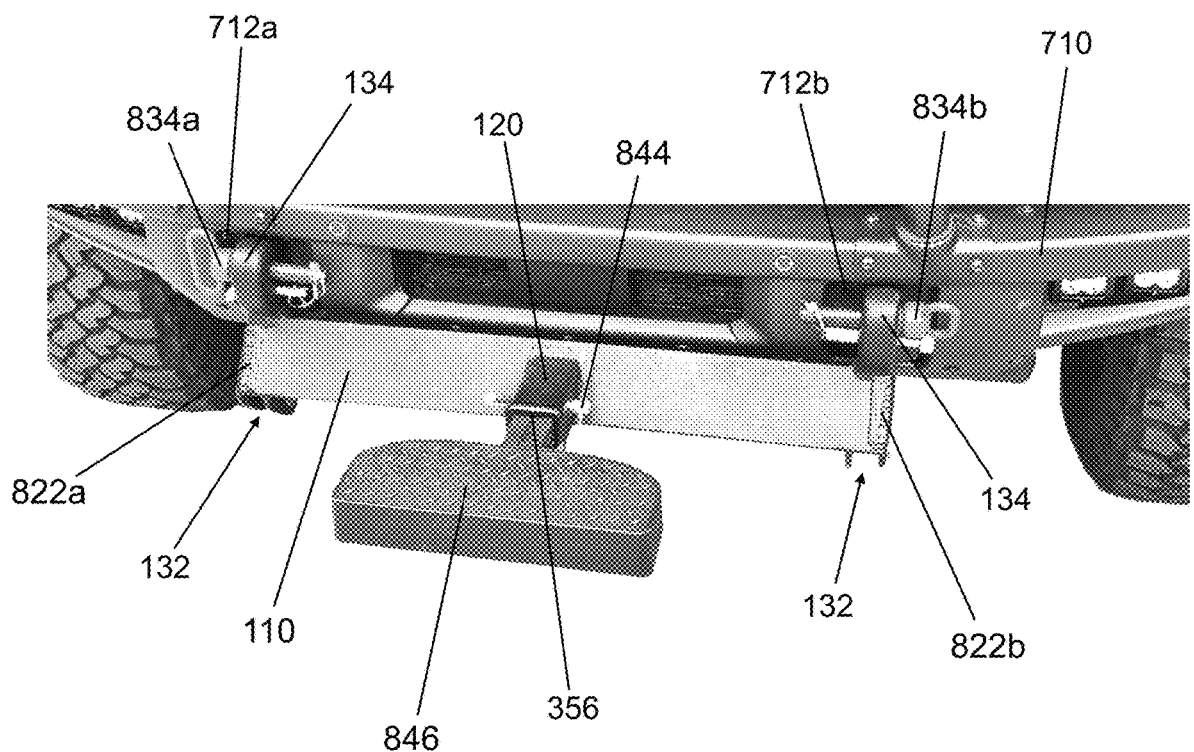
FIG. 8 illustrates a detailed perspective view of a vehicular utility mount system in use on an anterior portion of a vehicle in accordance with some embodiments of the present invention.

As shown in FIG. 8, a detailed perspective view of a vehicular utility mount system 100 in use on an anterior portion of a vehicle is provided. The vehicular utility mount system 100 may be coupled over and around a pair of circular ring-shaped front tow hooks extending out of respective bumper openings 712a, 712b formed within the bumper 710 of the vehicle. The vehicular utility mount system 100 may comprise an elongate support beam 110 which support a plurality of coupling structures disposed on either end of the beam 110 and a hitch receiver 120 disposed at the lengthwise midpoint of the beam 110.

The coupling structures may comprise a plurality of pairs of parallel vertical support panels 132 where each pair are coupled together via respective curved sheath structures 134. Each of the coupling structures may be attached to the elongate support beam 110 via one or more weld seams 822a, 822b arranged along the points of contact between the coupling structures and the beam 110. Each of the vertical support panels 132 may comprise one or more locking pins 834a, 834b inserted therethrough. Specifically, each of the locking pins 834a, 834b illustrated in FIG. 8 are inserted through apertures within respective pairs of parallel vertical support panels 132 and the aperture contained within the circular ring-shaped tow hooks. Further, each of the locking pins 834a, 834b may themselves have a pin clip disposed at the end thereof as shown in FIG. 8 which prevents the lockings pins 834a, 834b from being accidentally removed from the aforementioned apertures.

The hitch receiver 120 may be disposed at the lengthwise midpoint of the elongate support beam 110 and may extend therefrom at a roughly 45 degree angle. The hitch receiver 120 may comprise an opening 356 at a terminal end of the hitch receiver 120. The opening 356 is structured to accept an external hitch item 846 which may be secured within the hitch receiver 120 via a locking pin 844 that is inserted through an aperture within the receiver 120 and an aperture within the external hitch item 846. Both of the apertures may be horizontally aligned along a common axis to ensure that the locking pin 844 may be inserted through both. While the external hitch item 846 is illustrated in FIG. 8 as being a step-assist structure, it is understood that any equipment with an attached hitch may be utilized as the external hitch item 846.

With regard to the embodiments illustrated in FIGS. 1-8, each of the structural elements disclosed therein may comprise a layer of powder coating disposed therearound. Powder coating is a finishing technique used to provide a protective and aesthetic layer to a steel workpiece. There are various types of powder coatings available, but preferably a heavy texture black coating may be utilized on the structural elements of FIGS. 1-8 to provide structural elements that are highly durable and corrosion resistant, and prevent chipping, scratching, and fading while being easy to clean and maintain. Other types of powder coatings that may be utilized include smooth and glossy finishes, metallic and textured finishes, and coatings that offer specific functional benefits. The application of powder coatings involves the electrostatic application of the powder onto the surface of the workpiece, followed by curing in an oven.

With regard to the embodiments illustrated in FIGS. 1-8, to enhance the adaptability of the vehicular utility mount system, adjustable coupling structures may be incorporated. As an extension to the plurality of coupling structures, the adjustable coupling structures may allow for variability in the positioning and attachment of other associated structural elements. These adjustable coupling structures could include an adjustable bracket, a sliding track, or a rotatable joint, thereby increasing the adaptability and utility of the mount system. The adjustable coupling structures may be secured using a locking mechanism, for example, a locking pin similar to that utilized in the hitch receiver, which can allow for quick and secure adjustments when necessary.

The elongate support beam can also include a vibration dampening system. The vibration dampening system can serve to mitigate the transmission of vibrations from the vehicle to the attached structural elements, thereby increasing the stability and durability of the system. The vibration dampening system could utilize a variety of mechanisms such as rubber mounts, springs, or hydraulic dampeners. These dampening elements could be strategically located along the elongate support beam, particularly near the hitch receiver and the coupling structures to maximize their effectiveness.

The vehicular utility mount system may also comprise a material coating for the elongate support beam, the hitch receiver, and the plurality of coupling structures. The material coating can serve to enhance the durability and longevity of these components. The coating could be a corrosion-resistant substance, such as a galvanized layer, a paint, or a powder coating. Moreover, the coating can also provide an aesthetically pleasing finish to the mount system.

An additional safety feature that could be incorporated into the vehicular utility mount system is a load-sensing device. The load-sensing device, which may be attached to the elongate support beam, could serve to monitor the weight or strain on the vehicular utility mount system. The load-sensing device could include a strain gauge, a load cell, or a piezoelectric sensor. Information from the load-sensing device could be relayed to the driver, allowing for real-time monitoring of the load on the system and thereby enhancing the safety and reliability of the mount system.

Furthermore, the vehicular utility mount system could include a lighting system integrated within the elongate support beam, hitch receiver, or coupling structures. The lighting system can serve to enhance visibility during low-light conditions and improve safety. It may include LED lights, reflectors, or other forms of lighting elements. The lighting system could also be designed to integrate with the vehicle's existing lighting system, thereby providing synchronicity with the vehicle's signals and actions.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All features disclosed in the specification, claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Throughout this disclosure, the phrase 'modularly coupled' and similar terms and phrases are intended to convey that any element of a given class of elements may be coupled to another given element and vice versa with equal effect. For example, any extension cord of a plurality of extension cords may be modularly coupled to another extension cord and vice versa with equal effect. Further, throughout this disclosure, the phrase 'removably coupled' and similar terms and phrases are intended to convey that a given element may be iteratively coupled to and removed from another given element as desired. For example, a male plug of a first extension cord may be removably coupled to a female plug of a second extension cord as desired.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "coupled" or" connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law.

Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. A vehicular utility mount system, comprising:
    an elongate support beam having a first planar panel and a second planar panel, wherein:
        the first planar panel is arranged orthogonal relative the second planar panel, and
        the second planar panel comprises an opening formed therethrough;
    a hitch receiver disposed through the opening in the second planar panel, wherein:
        the hitch receiver comprises a hollow hitch body having a first side surface and a second side surface,
        a first locking pin aperture is disposed within the first side surface and a second locking pin aperture is disposed within the second side surface,
        the hollow hitch body comprises a proximal opening and a distal opening, and the proximal opening is disposed adjacent the first planar panel; and
    a first coupling structure and a second coupling structure, wherein:
        the first coupling structure is disposed at a first end of the elongate support beam and the second coupling structure is disposed at a second end of the elongate support beam,
        the first coupling structure comprises a first plurality of support panels oriented parallel to one another,
        the first plurality of support panels are coupled together via a first curved sheath structure oriented orthogonal to the first plurality of support panels,
        the second coupling structure comprises a second plurality of support panels oriented parallel to one another,
        the first and second coupling structures are configured to couple to vehicular tow hooks,
        the second plurality of support panels are coupled together via a second curved sheath structure oriented orthogonal to the second plurality of support panels,
        the first plurality of support panels and the second plurality of support panels are oriented parallel to one another,
        the first plurality of support panels each comprise a first aperture and a second aperture,
        the second plurality of support panels each comprise a third aperture and a fourth aperture, and
        one or more of the first, second, third, and fourth apertures are configured to accept a tow hook locking pin.

2. The vehicular utility mount system of claim 1, wherein the first planar panel comprises a first end portion disposed at the first end of the elongate support beam and a second end portion disposed at the second end of the elongate support beam.

3. The vehicular utility mount system of claim 1, further comprising: a plurality of vertical support panels.

4. The vehicular utility mount system of claim 3, wherein the plurality of vertical support panels are coupled to opposing sides of the hitch receiver.

5. The vehicular utility mount system of claim 3, wherein the plurality of vertical support panels are coupled to the first planar panel and the second planar panel.

6. The vehicular utility mount system of claim 1, wherein a first lengthwise edge of the first planar panel is coupled to a second lengthwise edge of the second planar panel.

7. The vehicular utility mount system of claim 6, wherein the first planar panel is structurally unitary, continuous, and monolithic with the second planar panel.

8. The vehicular utility mount system of claim 6, wherein the first lengthwise edge of the first planar panel is coupled via a common weld seam to the second lengthwise edge of the second planar panel.

9. The vehicular utility mount system of claim 1, wherein a first vertical support panel is coupled to the first side surface of the hollow hitch body and a second vertical support panel is coupled to the second side surface of the hollow hitch body.

10. The vehicular utility mount system of claim 1, wherein the second planar panel is coupled to both of the first side surface of the hollow hitch body and the second side surface of the hollow hitch body.

11. The vehicular utility mount system of claim 1, wherein the hitch receiver comprises a perimeter lip disposed at a distal end of the hollow hitch body.

12. The vehicular utility mount system of claim 1, wherein the opening is formed through a lengthwise midpoint of the second planar panel.

13. A vehicular utility mount system, comprising:
    an elongate support beam having a first planar panel and a second planar panel, wherein:
        the first planar panel is arranged orthogonal relative the second planar panel,
        a first lengthwise edge of the first planar panel is coupled to a second lengthwise edge of the second planar panel,
        the first planar panel is structurally unitary, continuous, and monolithic with the second planar panel, and
        the second planar panel comprises an opening formed through a lengthwise midpoint of the second planar panel;
    a hitch receiver disposed through the opening in the second planar panel; and
    a first coupling structure and a second coupling structure, wherein:
        the first coupling structure is disposed at a first end of the elongate support beam and the second coupling structure is disposed at a second end of the elongate support beam,
        the first coupling structure comprises a first plurality of support panels oriented parallel to one another,
        the first plurality of support panels are coupled together via a first curved sheath structure oriented orthogonal to the first plurality of support panels,
        the second coupling structure comprises a second plurality of support panels oriented parallel to one another,
        the first and second coupling structures are configured to couple to vehicular tow hooks, the second plurality of support panels are coupled together via a second curved sheath structure oriented orthogonal to the second plurality of support panels, the first plurality of support panels and the second plurality of support panels are oriented parallel to one another, the first plurality of support panels each comprise a first aperture and a second aperture, the second plurality of support panels each comprise a third aperture and a fourth aperture, and one or more of the first, second, third, and fourth apertures are configured to accept a tow hook locking pin.

* * * * *